United States Patent [19]
Wachob

[11] Patent Number: 5,155,591
[45] Date of Patent: Oct. 13, 1992

[54] METHOD AND APPARATUS FOR PROVIDING DEMOGRAPHICALLY TARGETED TELEVISION COMMERCIALS

[75] Inventor: David E. Wachob, Elkins Park, Pa.

[73] Assignee: General Instrument Corporation, Hatboro, Pa.

[21] Appl. No.: 425,117

[22] Filed: Oct. 23, 1989

[51] Int. Cl.⁵ .......................... A04N 7/08; A04H 1/02
[52] U.S. Cl. ...................................... 358/86; 455/4.2; 455/6.2
[58] Field of Search ............... 455/2, 3.1, 3.2, 3.3, 455/4.1, 4.2, 5.1, 6.1, 6.2, 6.3, 67.1, 67.2, 67.3; 358/84, 86

[56] References Cited

U.S. PATENT DOCUMENTS

| | | |
|---|---|---|
| 3,639,686 | 2/1972 | Walker et al. ................ 178/5.8 R |
| 3,769,579 | 10/1973 | Harney ................................ 325/31 |
| 4,546,382 | 10/1985 | McKenna et al. ................ 358/84 |
| 4,602,279 | 7/1986 | Freeman ........................... 358/86 |
| 4,646,145 | 2/1987 | Percy et al. ...................... 358/84 |
| 4,805,020 | 2/1989 | Greenberg ....................... 358/84 |
| 4,967,273 | 10/1990 | Greenberg ....................... 455/67 |

Primary Examiner—Reinhard J. Eisenzopf
Assistant Examiner—Lisa Charouel
Attorney, Agent, or Firm—Barry R. Lipsitz

[57] ABSTRACT

Different commercial messages are broadcast to different demographically targeted audiences in a cable television system or the like. A first television channel contains television programs and periodic commercial messages. A second television channel contains alternate commercial messages. Demographic characteristics of a viewer are identified, and commercial messages are selectively provided from the first or second channel, depending upon the viewer's demographic characteristics. Demographic data can be input by a viewer via a remote control, downloaded to a subscriber's converter from a remote headend, or programmed into the converter at installation. Prioritization of the demographic characteristics of a plurality of television viewers watching a program together enables commercials to be targeted to the viewer having highest priority. Statistical data can be maintained concerning the number and identity of subscribers viewing specific commercials.

10 Claims, 7 Drawing Sheets

METHOD AND APPARATUS FOR PROVIDING DEMOGRAPHICALLY TARGETED TELEVISION COMMERCIALS

BACKGROUND OF THE INVENTION

The present invention relates to cable television systems and apparatus, and more particularly to the provision of different commercial messages to different demographically targeted cable television audiences. Although the invention is described in the context of cable television systems, it will be appreciated that it has application in comparable systems, such as satellite broadcasting systems and the like.

Viewers of commercial television are well aware that a typical television channel contains television programs with periodic commercial message breaks. Advertisers sponsor television programs by purchasing space for their commercials during the broadcast of the program. Although different commercials are often run for the same television program in different geographic areas, there has been no way to target specific commercials to specific television viewers on a case-by-case basis.

It would be advantageous to provide a method and apparatus for targeting specific commercial advertisements to demographically selected audiences. Such a system would enable commercial advertisements to be matched to specific television viewers, thereby more efficiently utilizing advertising budgets. It would be further advantageous to maintain real-time records of demographic characteristics of particular television viewers and the programs they watch, for subsequent retrieval and analysis.

The present invention provides such a method and apparatus.

SUMMARY OF THE INVENTION

The present invention provides a cable television system or the like for broadcasting different commercial messages to different demographically targeted audiences. A headend transmits television signals. Means are provided for identifying demographic characteristics of a television viewer. Selection means, responsive to the identifying means, provide a particular commercial message transmitted from the headend based on the demographic characteristics.

Viewer demographic types can be determined in a variety of ways. In one approach, a user demographic key on a handheld remote control is actuated by the viewer before television channel selection is made. This demographic type is then stored in the memory of a cable television converter or the like. The converter will thereby know what demographic type is viewing a television program.

Alternate methods of determining individual viewer demographic types include household survey or diary information, known address/neighborhood locations or known ethnic locations. All of these approaches allow for demographic information to be programmed into a converter on an individual basis during installation of a cable television converter or, by known techniques from a cable system headend that transmits data to an addressable converter.

In one embodiment of the present invention, the headend transmits a first television channel comprising television programs with periodic commercial messages, and a second television channel comprising alternate commercial messages. The selection means provide a commercial message from the first or second channel depending on the demographic characteristics of a viewer. Such characteristics might include, for example, whether the viewer is male or female, and whether the viewer is an adult or a child.

Means are provided for determining when a commercial message break is about to occur, and the selection means are responsive thereto for providing an appropriate commercial message during the break. In a preferred embodiment, the headend transmits a plurality of alternate commercial message channels for use by the selection means. Thus, for example, a television program viewed by a child can have toy commercials, while the same program viewed by an adult can have commercials for items such as automobiles, air transportation services, and the like. In a more comprehensive system, the headend can transmit a plurality of television program channels each having periodic commercial message breaks, with each television program channel having a corresponding plurality of alternate commercial message channels associated therewith.

In order to provide a return to the television program at the termination of a commercial message break, a timer can be provided that allocates a specific time slot (e.g., 15 seconds, 30 seconds, 60 seconds) for commercial messages to be received. At the termination of the time slot, the system returns to the channel containing the television program. Other means, such as commercial message break start and stop data signals, can be provided to alert the selection means to switch from the television program channel to an appropriate commercial channel, and back. Such data signals can be transmitted by the headend as "tag information" on a separate data path in a conventional manner.

In order to accommodate a plurality of television viewers watching a television together, means are provided for prioritizing the demographic characteristics of a group of viewers. The selection means is responsive to the prioritizing means for providing a commercial message based on the prioritization.

In order to provide market research functions and enable accurate billing of advertisers for commercials presented to viewers, means are provided for storing data indicative of cable services selected by viewers and commercial messages provided by the selection means for subsequent retrieval and analysis by the headend.

The present invention also provides subscriber apparatus for use in receiving cable television services or the like. Means are provided for receiving television signals including a first television channel comprising television programs with periodic commercial message breaks and a plurality of additional television channels comprising commercial messages. Tuning means, coupled to the receiving means, provide a selected channel for viewing. Means are provided for identifying demographic characteristics of a television viewer. A determination is made as to when a commercial message break is about to occur on the first television channel, and selection means actuate the tuning means to provide a particular commercial message channel for viewing during a commercial message break, based on the viewer's demographic characteristics. Means are further provided for actuating the tuning means to return to the first television channel at the conclusion of a commercial message break.

A remote control is provided for use with a cable television converter, which comprises selector switches for enabling a user to remotely control various functions including channel selection. In accordance with the present invention, the remote control comprises means for enabling a user to input demographic data to the converter. Such means can comprise a plurality of switches for entering information indicative of the sex and age of the user.

In another embodiment, the present invention provides a cable television system or the like with the option of commercial free television programming. A headend transmits television signals, including a first television channel comprising television programs with periodic commercial messages and a second television channel comprising a non-commercial program (e.g., music, fine arts, or the like). Alternately, the second channel can provide another television program (e.g., a sports event) the viewer wants to watch intermittently during commercial breaks in the primary show being viewed. Means are provided for receiving the first channel from the headend, and determining when a commercial message break is about to occur on the first television channel. Means responsive to the determining means receive the second channel instead of the first channel during the duration of the commercial message break.

Headend apparatus is provided for broadcasting different commercial messages to different demographically targeted cable television audiences. Means are provided for transmitting a television signal containing television programs and periodic commercial message breaks on a first television channel on a cable distribution network. A library of recorded television commercials is provided for playback under the control of a system controller. Means concurrently transmit, on separate television channels on the cable distribution network, a plurality of different television commercials played back under the control of the system controller during a periodic commercial message break.

The headend apparatus can further comprise means for storing data indicative of demographic characteristics of a cable television subscriber. Means responsive to the stored data direct subscriber apparatus serving the subscriber to tune to a designated channel, during a periodic commercial message break, for receipt of a television commercial targeted to the subscriber. Means are provided for recording data indicative of commercials transmitted on the cable distribution network from the library, and for billing advertisers based on this data.

A method is provided for broadcasting different commercial messages to demographically different television audiences. A first channel is transmitted, containing television programs and periodic commercial messages. A second transmitted channel contains alternate commercial messages. Demographic characteristics of a viewer are identified, and commercial messages are selectively provided from the first or second channel, depending upon the demographic characteristics. A plurality of channels containing alternate commercial messages may be transmitted, wherein commercial messages are provided selectively from the first, second or an alternate channel depending on the demographic characteristics identified. The demographic data can be received from the television viewer, and prioritized where a plurality of television viewers are watching a television together.

DETAILED DESCRIPTION OF THE INVENTION

The present invention allows the targeting of particular commercial advertisements to television viewers having particular demographic characteristics, and the subsequent retrieval of market research data identifying the programs selected and commercials viewed by particular demographic types. The invention is disclosed in connection with a cable television system. It should be appreciated, however, that the invention is equally applicable to other television broadcast systems as will be apparent to those skilled in the art.

In accordance with the invention, a cable television converter tunes automatically to a predefined commercial channel when a commercial message break is about to occur in a television program being viewed. The predefined commercial channel contains commercials targeted to the viewer demographic type. The tuning from the program channel to the commercial channel is only minimally noticeable by the viewer. For example, the tuning can occur during the vertical blanking interval of the television program signal. The implementation of control functions during the vertical blanking interval is well known in the art, and circuitry for effecting a tuning change during the vertical blanking interval will be apparent to those skilled in the art. By enabling different converters to tune to different commercial channels, one viewer demographic type using one converter might see a commercial for automobiles while another viewer using a similar converter could see an advertisement for toys during the same commercial break.

Figure 1:
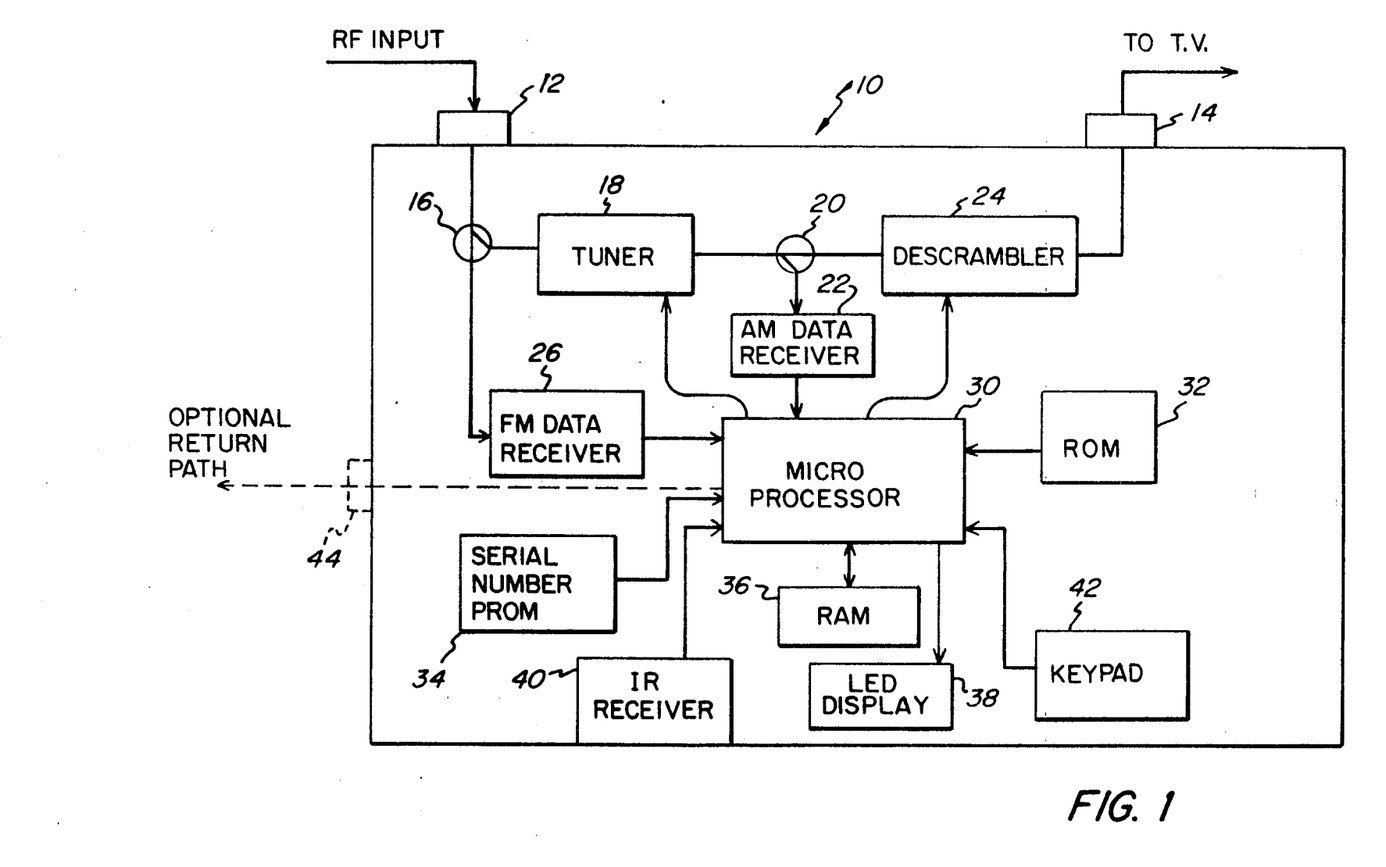
FIG. 1 is a block diagram of a cable television converter for use in connection with the present invention.

FIG. 1 illustrates, in block diagram form, a converter 10 used in connection with the present invention. An RF input signal, comprising a plurality of television program channels and commercial message channels, is input at terminal 12 from a cable system headend. The input signal is coupled, via splitter 16, to a tuner 18 that is used to tune to a particular television program channel or commercial channel under the direction of microprocessor 30. The output of tuner 18 is coupled via splitter 20 to a conventional descrambler 24, which outputs television program signals to a viewer's television set (or other video appliance, such as a VCR) via terminal 14. An AM data receiver 22 receives "tag information" carried on a particular television channel and inputs the information to microprocessor 30. FM data receiver 26 receives other information from the headend (i.e., descrambler authorization data) for input to microprocessor 30. The use of AM and FM data receivers in cable television converters for retrieving tag information and addressable data is well known.

Operational software for converter 10 is contained in ROM 32. Existing cable television converters, such as the DP5/DPV5/DPBB converters and the DP7 family of converters manufactured by the Jerrold Division of General Instrument Corporation can be upgraded to implement the present invention by interchanging the ROM chip contained in the converter with a new ROM device containing additional software.

A serial number PROM 34 in converter 10 contains a unique code identifying the converter to the headend, enabling the converter to be addressed on an individual basis. RAM 36 is the operating memory for microprocessor 30, and in accordance with the present invention stores data indicative of demographic characteristics of a viewer or viewers using the converter at any given time. RAM 36 may also store data indicative of the television channels or other cable services selected by particular demographic types. This data can be appended with date and time information by microprocessor 30, to enable subsequent cross-referencing of channels selected by viewers to the programs shown on the channel at the time of selection.

LED display 38 outputs the television channel number to which the converter is tuned by a viewer. IR receiver 40 receives data transmitted by a handheld remote control for input to microprocessor 30. Keypad 42 enables users to input channel selection and other information to the converter directly without the use of a handheld remote control.

Figure 2:
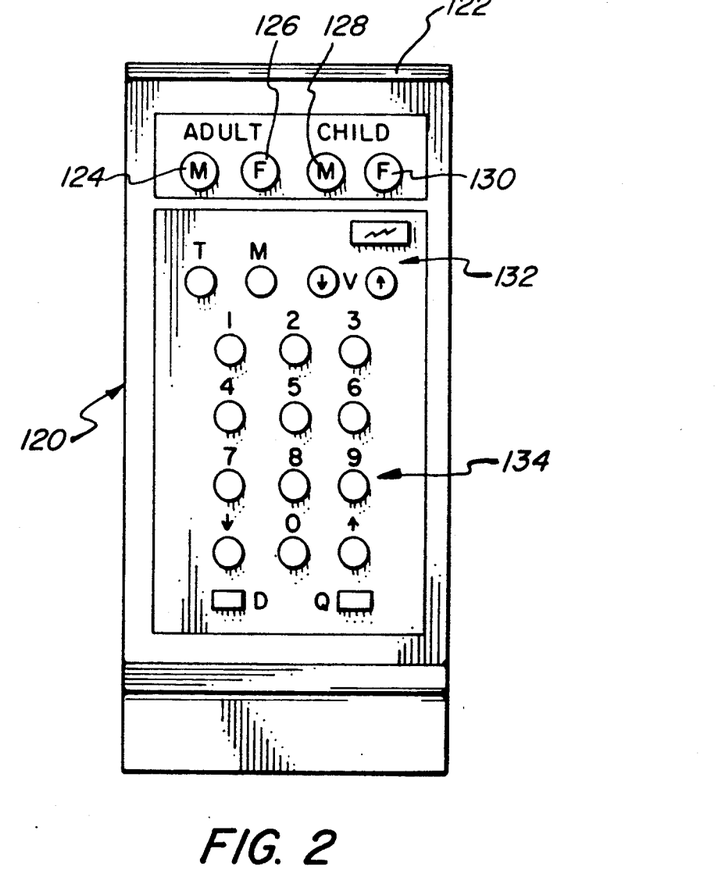
FIG. 2 is a plan view of a handheld remote control that a viewer can use to input demographic information.

A remote control 120 for use with converter 10 is illustrated in FIG. 2. Data are transmitted from the front end 122 of remote control 120 using an infrared or equivalent remote data path. A plurality of conventional function buttons 132 and channel selection buttons 134 are provided. In accordance with the present invention, a plurality of switches 124, 126, 128, 130 is provided to enable a user to input demographic data to converter 10. For example, switches 124 and 126 can be provided to indicate that the viewer is an adult male or female, respectively. Switches 128 and 130 can be provided to indicate that the viewer is a male or female child, respectively. Other demographic information can alternately be provided via switches 124-130, or by the provision of additional demographic switches on remote control 120. Equivalent switches can also be provided on the converter itself, as part of keypad 42. In an alternate embodiment, a user code is entered on the numeric keys of the remote control or converter to identify the demographic type of the viewer before any commands are executed. Use of a user code would expand the number of demographic types allowable, but may require additional keys to be actuated to initiate a converter response.

In operation, a viewer is required to press a demographic key on the remote control 120 (or on keypad 42) before any other key is depressed to select a channel or other converter function. The demographic data (and any other relevant data, such as data indicative of the converter function selected) are then stored in RAM 36 so that the converter knows what demographic type is watching the television associated with the converter at any given instant. This implementation provides a dynamic system where the viewer demographics can change at any time. In addition, multiple viewer data and/or demographic types can be entered and stored in the converter. A "delete" button can be provided to tell the system that a particular demographic type has left the viewing area. Prioritization of multiple viewers for use in selecting appropriate commercials is handled as described below in connection with FIG. 4.

Alternate methods of identifying viewer demographic types include a passive approach, relying upon image recognition technology to determine what viewer or viewers are watching television at any given time. Demographic types can also be identified using household survey or diary information, known address-/neighborhood locations or known ethnic locations. Information determined by such techniques is transferred into RAM 36 of converter 10 on an individual basis by a technician installing the converter, or via a communication from the cable system headend which addresses converter 10, via FM data receiver 26, to download the demographic data. This approach allows the headend to update and modify changes in household demographics for particular subscribers.

A headend in accordance with the present invention transmits television program channels to converter 10 together with separate channels containing commercial messages (i.e., advertisements). Information alerting the converter as to when a commercial message break is about to occur during a television program, and identifying the channels containing commercials for different demographic audiences, is transmitted by the headend in the form of tag information on the particular television program channel to which the converter is tuned. The tag information is detected by AM data receiver 22 and input to microprocessor 30, which forces tuner 18 to tune in the appropriate commercial message channel at the appropriate time. The AM tag data detected by receiver 22 is carried on the audio portion of the television program signal in a conventional manner. Alternately, the tag data can be included in the vertical blanking interval using known techniques to alert converter 10 (via microprocessor 30) that a commercial break is about to occur.

Once converter 10 has been alerted that a commercial message break is imminent, it identifies the demographic characteristics of the current viewer from data stored in RAM 36. The converter software stored in ROM 32 then initiates an automatic channel change during a vertical blanking interval to the specific commercial message channel to which the demographic characteristics correspond. This channel is maintained for either a pre-established fixed time period (e.g., 15, 30, 45 seconds, etc.) by a timer operatively associated with microprocessor 30, or until a "return to original channel" instruction is detected by the converter through tag data transmitted by the headend. After the commercial break, the converter returns back to the original television program channel during a vertical blanking interval. Switching back and forth between television program and commercial message channels during the vertical blanking interval minimizes any visible interruption to the television viewer. The software for accomplishing the retuning of tuner 18 contains program instructions that will be apparent to those skilled in the art.

In the event separate commercial message channels are not being transmitted by the headend, or if commercials already included on the television program channel being viewed are appropriate for the viewer, the converter maintains the current television program channel during commercial breaks and no automatic tuning to alternate commercial message channels occurs. The system of the present invention is compatible with existing systems, and enables "cable-ready" televisions viewing cable television channels directly (without a converter) to receive the commercials carried on the television program channel being viewed.

Figure 3:
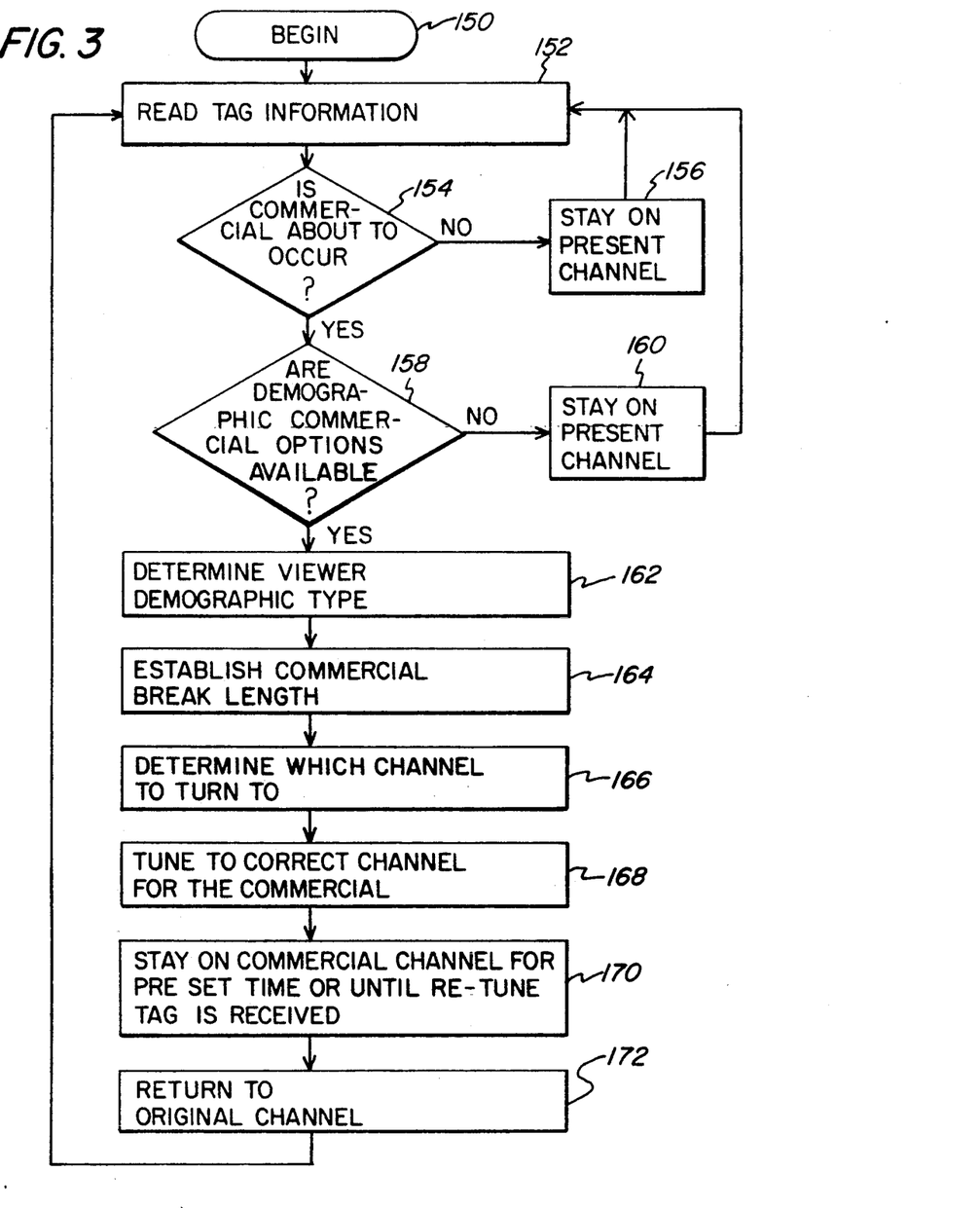
FIG. 3 is a flowchart of a software routine used by the converter of FIG. 1 in connection with the present invention.

A flowchart illustrating the operation of the converter software contained in ROM 32 in a preferred embodiment is provided in FIG. 3. The software routine begins at box 150, which passes control to box 152 where tag information transmitted by the system headend is read. The tag information defines if and when a commercial is about to occur, how long it will last, and which channel the converter should tune to given the viewer demographic type. If the tag information does not indicate that a commercial is about to occur, as determined at box 154, the converter stays tuned to the present television program channel, as indicated at box 156. Otherwise, control passes to box 158 where a determination is made as to whether demographic commercial options are available. If not, the converter remains tuned to the present channel as indicated at box 160.

If the converter contains data indicative of a viewer's demographic characteristics, and the headend is providing a channel for commercials targeted to such a viewer, the targeted commercials will be provided to the viewer. At box 162, the viewer demographic type stored in RAM 36 is determined. At box 164, the length of the impending commercial message break is determined from the tag information transmitted by the headend. At box 166, the converter determines which channel to tune to in order to receive the targeted commercials. The channel information is either defined by the tag information received from the headend, or has previously been stored in converter memory 36. Then, at box 168, the converter tunes to the correct channel for the commercials to be received. This is accomplished by a signal from microprocessor 30, that directs tuner 18 to tune in the appropriate commercial message channel.

Tuner 18 remains tuned to the commercial message channel for a preset length of time (i.e., the length of the commercial break) or until new tag information is received from the headend directing the converter to retune to the original television program channel. The return to the original channel is effected at box 172. Control then returns to box 152 where the process repeats.

In the event that a group of television viewers are watching a television together, and more than one viewer demographic type is present, a hierarchy/priority decision is made by the converter software to determine the dominant demographic type present. The prioritization method can be based, for example, upon a weighted average of all the viewers present. Alternately, the viewer who initiated the present channel decision, or the person who makes household buying decisions can be given priority. The flowchart of a routine for receiving data input by a viewer (including demographic data), dealing with a plurality of viewers, and storing said data for possible later retrieval and analysis is provided in FIG. 4.

Figure 4:
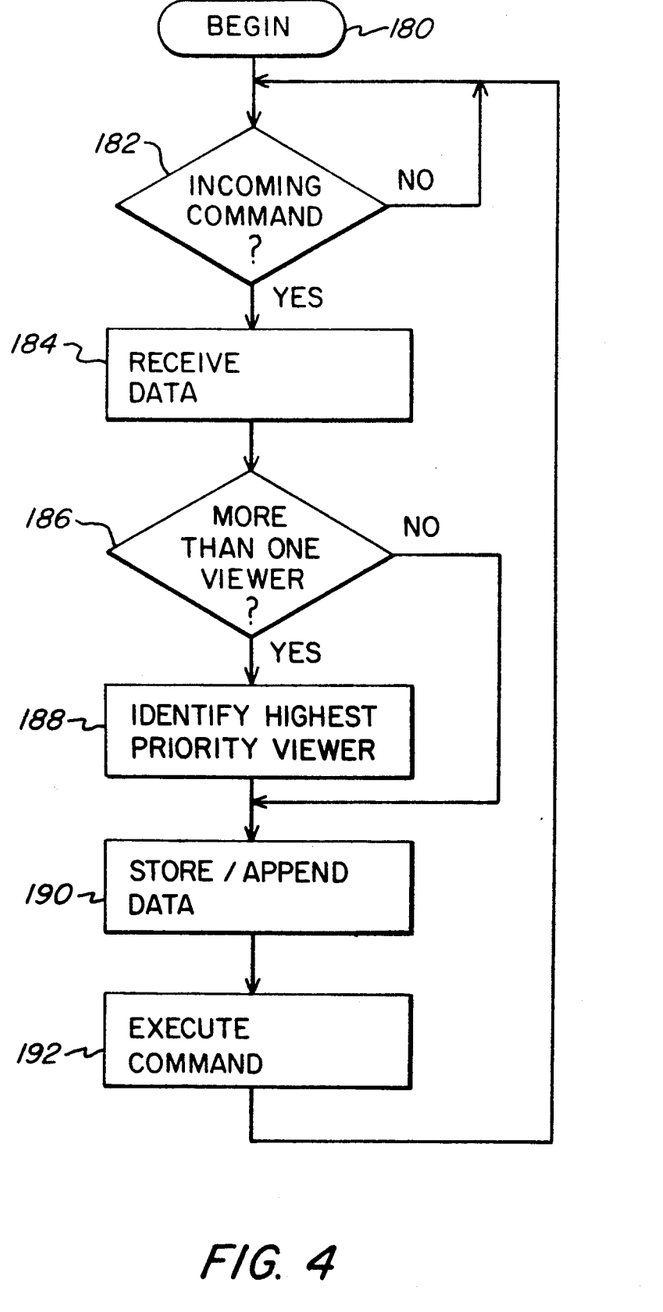
FIG. 4 is a flowchart of a routine used by the converter of FIG. 1 for storing command and demographic data entered by a viewer and prioritizing demographic data of a plurality of viewers watching a television program together.

The routine of FIG. 4 commences at box 180, and control is passed to box 182 where a determination is made as to whether a command initiated by a viewer is being input to the converter. Once an incoming command is detected (e.g., from a viewer's remote control), control passes to box 184 where data indicative of selections made by a viewer, including demographic data pertaining to the viewer(s), are received. At box 186, a determination is made as to whether demographic data were received for more than one viewer. If so, the highest priority viewer is identified at box 188. The viewer demographic type of the highest priority viewer is stored in RAM 36, as indicated at box 190. Then, at box 192, the actual command (e.g., change of channel) entered by the viewer is executed. Control then returns to box 182 where the process repeats.

In the event the cable television system operator wants to provide market research data to advertisers concerning, e.g., demographic information, channels/programs viewed, pay-per-view purchases, etc., RAM 36 will also store cumulative data indicative of the selections made by users via the remote control or converter keyboard. As indicated at box 190, microprocessor 30 will append this data with the date and time of the selections so that the actual programs or other services selected can be identified. The date and time information can be received by microprocessor 30 from the headend via FM data receiver 26. Information concerning other converter functions, such as the position of A/B switches for bypassing the converter or viewing off-air programs, can also be determined and stored. A routine for the subsequent transmission of this market research data to the headend is shown in FIG. 7.

Figure 7:
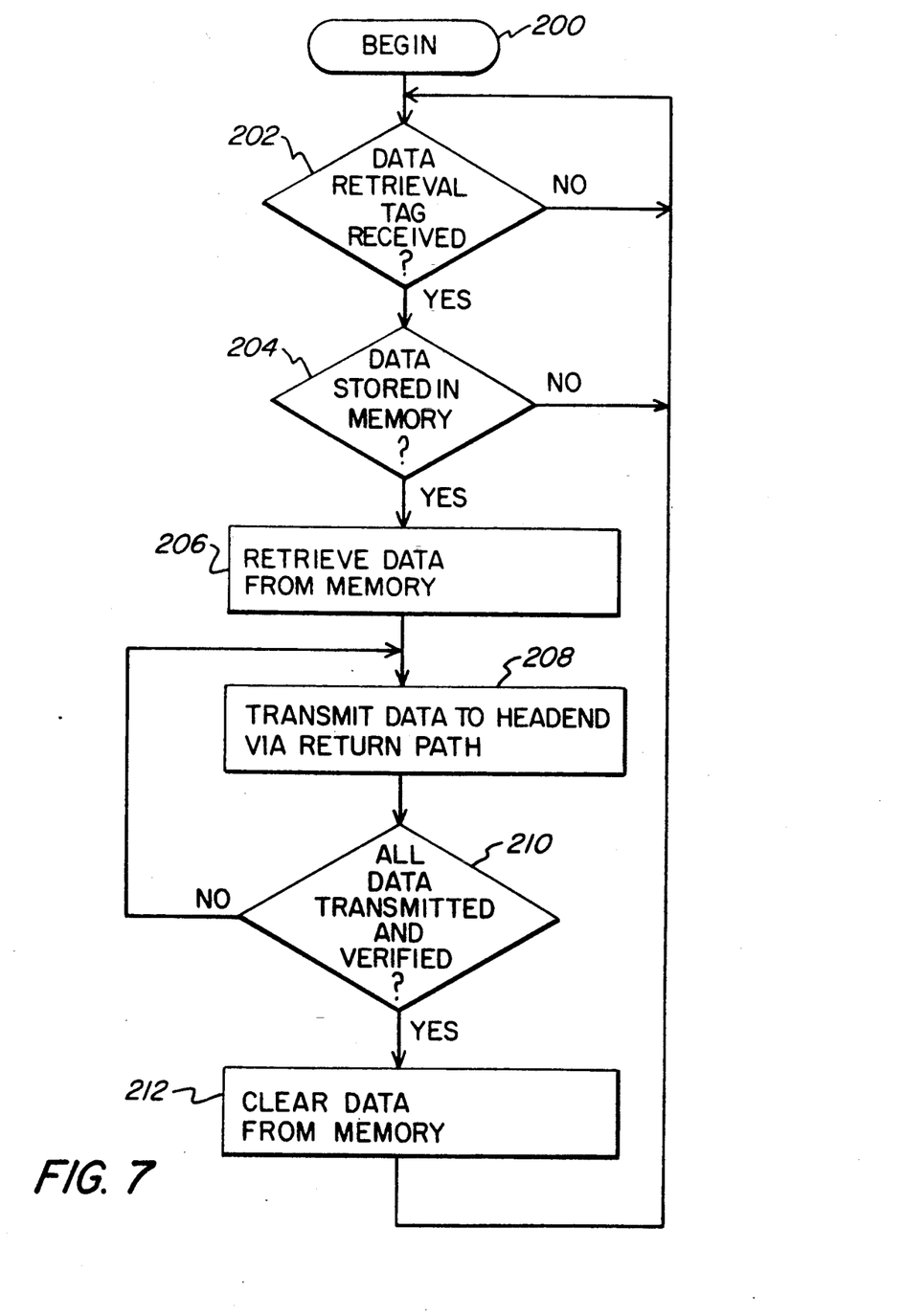
FIG. 7 is a block diagram of a routine used by the converter of FIG. 1 to retrieve stored data and transmit it to the headend.

The routine of FIG. 7 commences at box 200, and at box 202 a determination is made as to whether the converter 10 (FIG. 1) has received a data retrieval tag instruction from the headend. Such an instruction would be sent down the cable and received by FM data receiver 26. Upon recognition of a data retrieval tag in the FM data stream addressed to the particular converter, microprocessor 30 determines whether any pertinent data are stored in RAM 36, as indicated at box 204. If not, control returns to box 202 until a data retrieval tag instruction is received and relevant data are found in RAM 36.

If relevant market research data have been stored in RAM 36, control passes from box 204 to box 206 where the data are retrieved from RAM 36. As indicated at box 208, the data are then transmitted to the headend via return path 44, which may be any conventional return path well known in the art. For example, if a telephone return path is used, return path 44 will include a modem to modulate the data for transmission over a telephone line. In a two-way cable system, an RF return path may be used. At box 210, a determination is made as to whether all of the pertinent market research data have been transmitted to the headend and whether the transmission has been verified. If not, the data transmission repeats until it is complete. At box 212, the accumulated market research data are cleared from RAM 36, although the current viewer demographic data will remain so that a user will not have to re-enter this information after the market research data have been retrieved. Control then returns to box 202 to await the next request by the headend for the retrieval of market research data from the converter.

Figure 5:
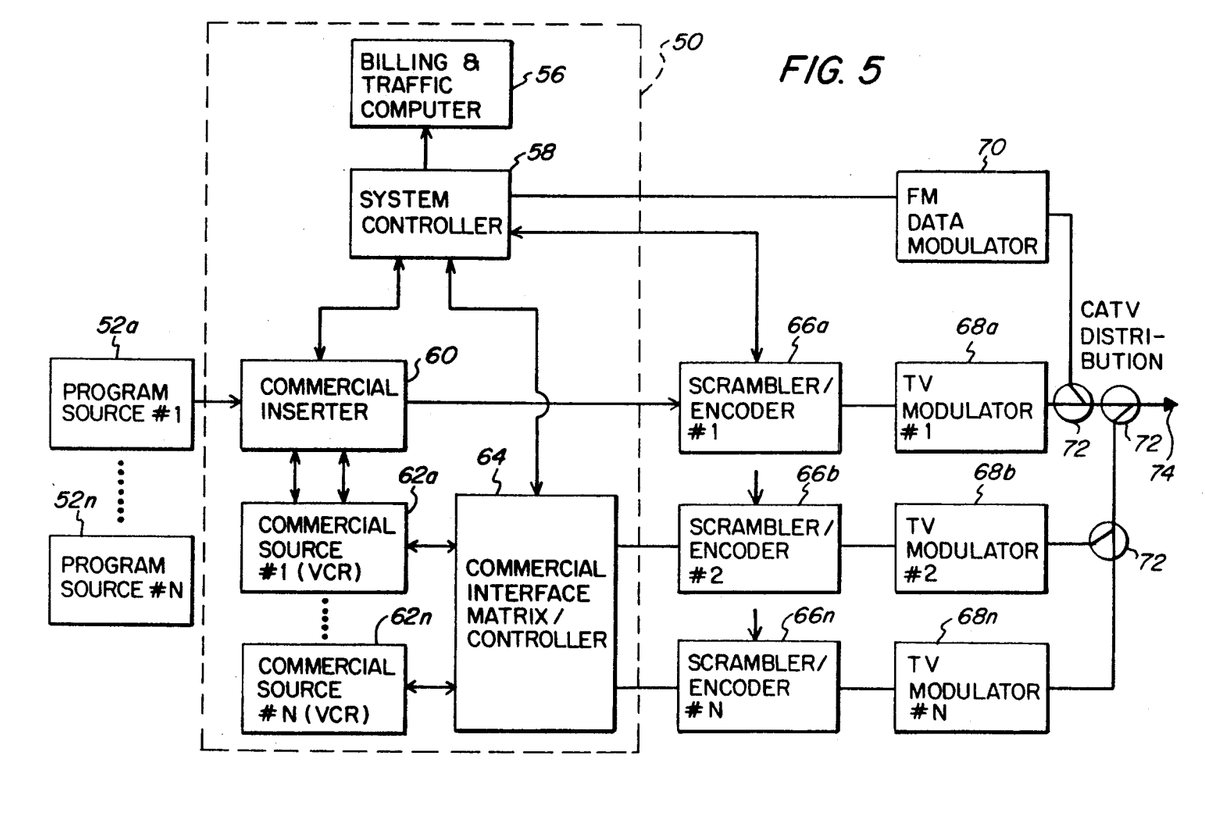
FIG. 5 is a block diagram of headend apparatus in accordance with the present invention.

One embodiment of a cable television system headend that can be used to implement the present invention is shown in block diagram form in FIG. 5. The components for handling commercial message sequencing and insertion are depicted in box 50. In this embodiment, the cable system operator, who controls the headend, is provided with the capability to insert commercials in the commercial break portions of programs carried on the main television program channel, and also for providing a plurality of alternate commercial channels targeted to different demographically defined audiences.

A system controller 58, which comprises a computer such as a personal computer or mini computer, provides overall control of a commercial inserter 60, commercial sources 62a-n, and a commercial interface matrix/controller 64. Controller 58 also provides billing and traffic data to a billing and traffic computer 56 that is shared with other conventional headend components (not shown) for billing subscribers and advertisers, and managing the cable television services provided.

Commercial inserter 60 receives commercials from one or more commercial sources 62a-n which may, for example, comprise VCRs, video disc players, or the like, containing recorded commercial messages. The commercial inserter can serve a plurality of television program channels, each fed by a respective program source 52a-n. Each program source carries television programs having periodic commercial message breaks. Commercials are inserted during the commercial message breaks by commercial inserter 60, and output on the same television channel that carries the program source via a scrambler/encoder 66a and television modulator 68a for each television program channel. The scrambler/encoder scrambles premium program signals as necessary, and encodes the program signal with the tag information necessary to identify the commencement of a commercial break, etc. The channel signal output from television modulator 68a is coupled to the cable television distribution system at terminal 74 via a coupler 72, in a conventional manner.

Commercial interface matrix/controller 64 enables the cable system operator to provide a plurality of alternate commercial message channels, each of which is scrambled and encoded as necessary by scrambler/encoders 66b-n, which in turn output the commercial message channels to television modulators 68b-n. Each television modulator outputs the commercial messages input to it on a different channel. The channels are coupled to the cable television distribution network via couplers 72 for output on terminal 74.

The individual commercials contained in an alternate commercial message channel are retrieved by commercial interface matrix/controller 64 from commercial sources 62a-n. Where, for example, an alternate commercial message channel is provided for children, commercials for various toys can be retrieved by controller 64 from commercial sources 62a-n.

System controller 58 provides overall control of the headend apparatus. For example, it controls the state of commercial inserter 60 to select between a television program from program source 52a and a commercial message from commercial sources 62a-n. Commercials from sources 62a-n are available on a time shared basis, under the control of software contained in the system controller. In this manner, for example, the same commercial can be provided on the main television program channel (via commercial inserter 60) and on an alternate commercial message channel (via commercial interface matrix/controller 64) at different time slots within the same commercial break. For example, the same commercial can be run on one channel during the first 15 seconds of a 45 second commercial break, and on another channel during the last 15 seconds of the same commercial break. The ordering of various different commercials within a commercial break, and the selection of those commercials is ultimately controlled by system controller 58 in accordance with sequencing rules established by the cable system operator.

As noted above, tag information necessary, e.g., for the converter to determine that a commercial break is about to occur on a given channel, is "encoded" on television channels via scrambler encoders 66a-n. This information is included either as AM data in the audio portion of the television signal, or as vertical blanking interval data. Specific tag data and timing of such data are relayed to scrambler/encoders 66a-n via system controller 58. The tag information can be encoded with or without signal scrambling.

An FM data modulator 70 is provided to enable the headend to download information, such as demographic information, to subscriber converters. This information can be transmitted on an individual basis where it is addressed to a particular converter, globally, or by groups of converters assigned to subscribers having similar demographic characteristics.

Billing and traffic computer 56 allows for accurate commercial tracking and advertiser billing. This computer, through a clock in system controller 58, records when various commercials were run, with data indicative of the channel on which each commercial was run and for how long. Feedback to advertisers can also be provided on who and how many people viewed a particular commercial, through the use of an optional return path 44 provided in converter 10 (see FIG. 1). Optional return path 44 comprises an output from microprocessor 30 that communicates with the headend via the cable television network (where a two-way system is provided) or on another return path, such as a telephone line. Return paths for providing two-way communication between cable television headends and subscriber converters are well known in the art.

Figure 6:
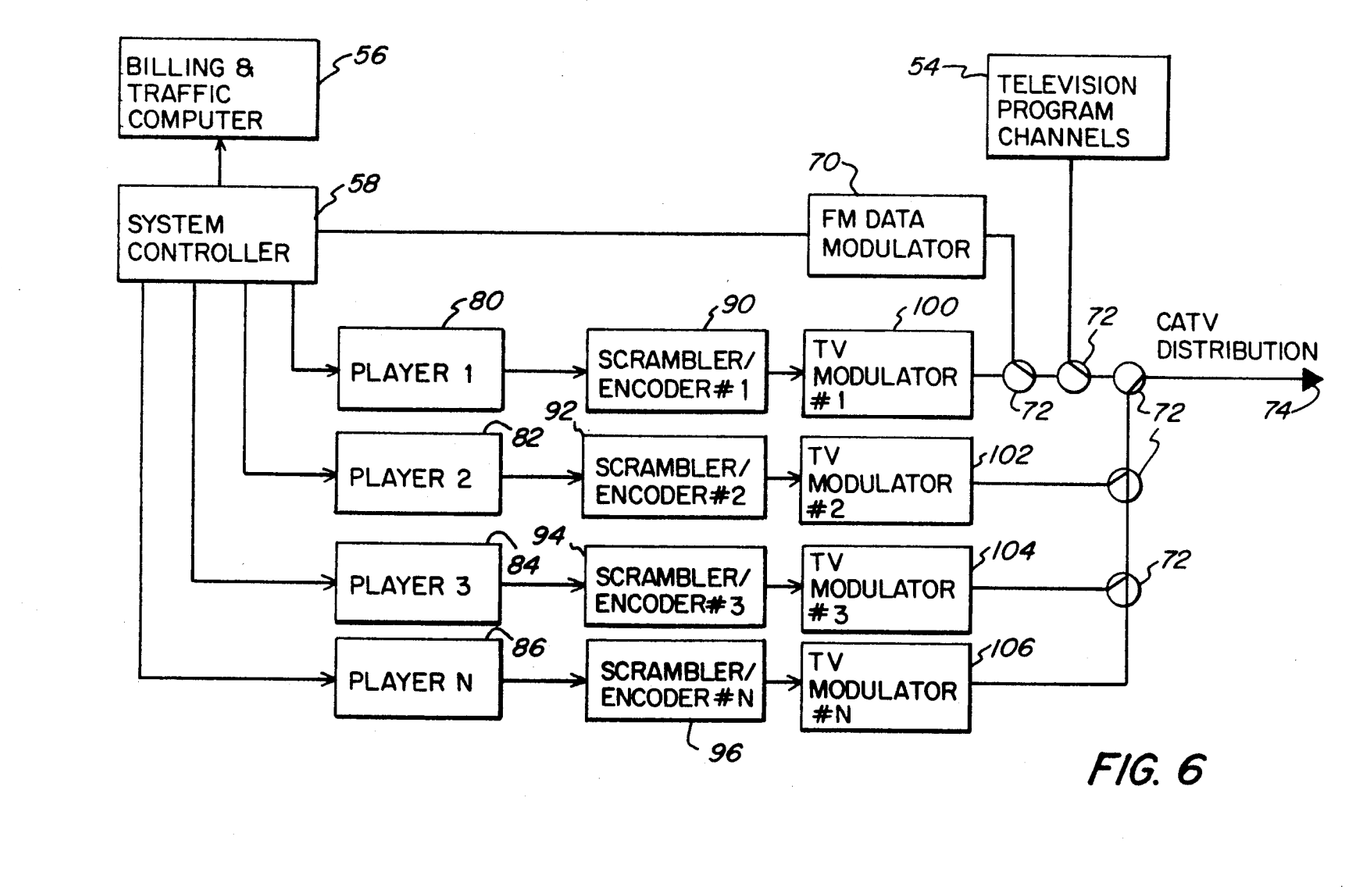
FIG. 6 is a block diagram showing an alternate embodiment of headend apparatus in accordance with the present invention.

FIG. 6 illustrates an alternate headend embodiment, wherein commercial interface matrix/controller 64 is eliminated. A plurality of television program channels 54 are coupled, via a coupler 72, for output on the cable television distribution network at terminal 74. The television program channels contain television programs and periodic commercial messages. Alternate commercial messages are provided on a plurality of commercial message channels that are also coupled to the cable television distribution network. Each alternate commercial message channel receives commercials from an associated commercial player 80, 82, 84, 86 controlled by system controller 58. The commercial players can comprise, for example, video disc players equipped with interchangeable video discs each containing a plurality of commercials. Each player can retrieve and play back any of the commercials from a video disc on a random access basis. The system operator programs a set of commercials for playback on each commercial message channel in any order desired. In practice, the system operator will create sets of commercials to fill commercial breaks of different time periods and grouped to target different demographic audiences.

Television signals containing the commercials are output from each player to scrambler/encoders 90, 92, 94, 96, respectively. The scrambled and/or encoded commercial signals are input to television modulators 100, 102, 104, 106, respectively, where the commercials from each player are output on a different television channel. These television channels form the alternate commercial message channels retrieved by subscriber converters as described above. The commercial message channels are coupled to the cable television distribution network by couplers 72.

In another embodiment of the present invention, a "commercial killer" option can be provided. In this embodiment, one of players 80, 82, 84, 86 will play a non-commercial program (e.g., music, fine arts, etc.) instead of commercials. A subscriber converter can be programmed to tune to the non-commercial channel during all commercial breaks, and then return to the regular television program channel upon the completion of each commercial break. With this feature, subscribers can eliminate all commercial messages from their television viewing. Alternately, a subscriber converter can be programmed to tune to another program channel (selected by the viewer) during commercial breaks occurring on the primary channel being viewed. Thus, for example, a viewer can watch portions of a second sports event during the commercial breaks in an event of primary interest.

Demographic programming is also available using the apparatus of the present invention, allowing total program material (including programs and commercials) to be automatically selected by the converter based on a viewer's demographics. A viewer would tune to a certain channel number, and all programming for the viewer would be provided by the converter automatically tuning to program and commercial channels according to demographics or pre-established viewer preferences.

It will now be appreciated that the present invention provides a system, apparatus, and method for broadcasting different commercial messages to different demographically targeted audiences. Although the invention has been described in connection with various preferred embodiments, those skilled in the art will recognize that various modifications may be made thereto. For example, the invention is not limited to use in a cable television system, and can be utilized in connection with other television transmission schemes. It is intended that the following claim language be read in its broad sense to cover all such equivalent schemes.

I claim:

1. Apparatus for use in receiving television services, comprising:
    means for receiving television signals including a first television channel comprising television programs with periodic commercial message breaks and a plurality of additional television channels comprising commercial messages;
    tuning means coupled to said receiving means for providing a selected channel for viewing;
    means for identifying demographic characteristics of a television viewer;
    means for determining when a commercial message break is about to occur on said first television channel;
    means for prioritizing the demographic characteristics of a plurality of television viewers currently watching a television together; and
    selection means, responsive to said determining means and said prioritizing means, for actuating the tuning means to provide a particular commercial message channel for viewing during a commercial message break, based on said prioritization of demographic characteristics.

2. Apparatus in accordance with claim 1 further comprising:
    remote control means for enabling a viewer to transmit demographic data to said identifying means.

3. Apparatus in accordance with claim 1 further comprising:
    means for storing data indicative of commercial messages provided by said selection means for subsequent retrieval and analysis by a headend.

4. Apparatus in accordance with claim 1 further comprising:
    means for enabling a viewer to input demographic data to said identifying means.

5. Apparatus in accordance with claim 1 further comprising:
    means for actuating said tuning means to return to said first television channel at the conclusion of a commercial message break in the event said selection means has provided a commercial message from a channel other than said first television channel during the break.

6. A television system for providing substitute television programming during commercial breaks in a primary program, comprising:
    a headend for transmitting television signals, including a first television channel comprising television programs with periodic commercial messages and a second television channel comprising another viewer selected backup program;
    means for receiving said first channel from said headend;
    means for determining when a commercial message break is about to occur on said first television channel; and
    means responsive to said determining means for receiving said second channel instead of said first channel during the duration of the commercial message break.

7. Headend apparatus for broadcasting different commercial messages to different demographically targeted television audiences, comprising:
    means for transmitting a television signal containing television programs and periodic commercial message breaks on a first television channel on a television signal distribution network;
    a library of recorded television commercial for playback under the control of a system controller;
    means for concurrently transmitting, on separate television channels on said distribution network, a plurality of different television commercials played back under the control of said system controller during a periodic commercial message break for selective receipt of different commercials by a universe of viewers;
    means for recording data indicative of the number of viewers that are provided with a given commercial transmitted on said distribution network from said library; and
    means responsive to said recording means for billing an advertiser based on said data.

8. Headend apparatus in accordance with claim 7, further comprising:
    means for storing data indicative of demographic characteristics of one of said viewers; and means, responsive to data stored in said storing means, for directing viewer apparatus serving said one of said viewers to tune to a designated channel during said periodic commercial message break for receipt of one of said plurality of different television commercials targeted to the viewer.

9. A system for automatically selecting television programs and commercials for a viewer, based on data pertaining the viewer, comprising:
   means for storing data indicative of predetermined characteristics of said viewer;
   means, responsive to said stored data, for causing a television signal receiver to select from a plurality of programs a television program targeted to viewers having said characteristics; and
   means, responsive to said stored data during a commercial message break of said selected television program, for directing said television signal receiver to select, from a plurality of commercials, a television commercial targeted to viewers having said characteristics.

10. Apparatus in accordance with claim 5 wherein said actuating means comprises:
    a timer for actuating the return to said first television channel a predetermined time period after a commercial message break has commenced.

* * * * *